United States Patent [19]

Symon

[11] Patent Number: 5,033,717

[45] Date of Patent: Jul. 23, 1991

[54] LIFTING DEVICE FOR VEHICLE PARTS

[76] Inventor: Peter Symon, M-28 East, Munising, Mich. 49862

[21] Appl. No.: 14,639

[22] Filed: Feb. 13, 1987

[51] Int. Cl.[5] .......... B60P 1/48

[52] U.S. Cl. .......... 254/8 B; 254/124; 254/133 R; 254/134

[58] Field of Search .......... 254/8 B, 8 R, 124, 133, 254/134; 269/17

[56] References Cited

U.S. PATENT DOCUMENTS

| | | | |
|---|---|---|---|
| 2,747,837 | 5/1956 | Turner | 254/134 |
| 3,062,500 | 11/1962 | Arnes et al. | 254/134 |
| 3,109,626 | 11/1963 | Arnes et al. | 254/134 |
| 3,338,556 | 8/1967 | Sluse | 254/134 |
| 3,773,293 | 11/1973 | Arnes | 254/134 |
| 4,118,010 | 10/1978 | Hanscom | 254/134 |
| 4,239,196 | 12/1980 | Hanger | 254/133 |
| 4,640,495 | 2/1987 | Parsons | 254/134 |

*Primary Examiner*—Judy Hartman

*Attorney, Agent, or Firm*—Varnum, Riddering, Schmidt & Howlett

[57] ABSTRACT

A lifting device (10) for facilitating installation and removal of a plurality of vehicle parts comprises a castered base (12) and a boom (14) pivotally mounted to the base (12) through a horizontal axis of rotation by a mast (46). A pneumatic jack (70) mounted to a between the base (12) and the boom (14) effects pivotal movement of the boom (14) between upper and lower positions. A receiver (16) is rotatably mounted on a horizontal axis of rotation to a rear portion (104) of the boom (14). A tie rod (122) pivotably mounted to and between the mast (46) and the receiver (16) guides the receiver (16) through rotational movement and maintains the same in a horizontal condition as the boom (14) moves between the upper and lower positions. The receiver (16) is adapted to interchangeably mount on a vertical axis of rotation one of a plurality of vehicle part attachments, such as a cradle attachment (152), a flywheel attachment (178) or a clutch attachment (242) adjustably mounting through vertical and horizontal axes of rotation a starter (154), a flywheel (180) or a clutch (244), respectively. In this manner, the device (10) is adapted to interchangeably mount for universal adjustment in a variety of directions in three-dimensional space, a plurality of vehicle parts so as to facilitate the installation and removal of the same.

7 Claims, 3 Drawing Sheets

LIFTING DEVICE FOR VEHICLE PARTS

FIELD OF THE INVENTION

The invention relates to a device for supporting work pieces and more particularly to a device for removably and adjustably mounting a variety of vehicle parts so as to facilitate installation and removal of the same.

BACKGROUND OF THE INVENTION

It is common knowledge that after a certain amount of usage of commercial and recreational vehicles, operative parts thereof, including flywheels, clutches, starters, transmissions, drive shafts, bell housings and the like, wear or breakdown and are therefore in need of repair or replacement. Because of the weight, size and shape of such parts, and the confined space in which a mechanic must ordinarily work, handling of such parts, when being removed or installed is a time-consuming, strenuous and dangerous unless a properly designed mechanical device is employed.

A conventional mechanical or hydraulic jack is generally unsatisfactory for this purpose because of its failure to provide adequate support for parts of irregular shape, with the resulting danger that the removed part may topple from the jack and injure the mechanic. In addition, use of the conventional jack has been objectionable because such devices have required laborous and time-consuming efforts of the mechanic and usually require that the same be assisted by another mechanic or helper in removing or installing the automotive part being replaced or repaired due to the fact that such jacks do not provide a means to adjustably guide the part upon the jack so that it may be lifted and returned to its original position. Accordingly, use of these prior-art jacks are costly due to the relatively high costs of labor. Also, conventional jacks are ordinarily limited to movement in vertical directions.

Devices which overcome the foregoing and other drawbacks of conventional hydraulic jacks are known. For example, U.S. Pat. No. 3,948,484, to Tesinsky, issued Apr. 6, 1976, discloses a device to be used in conjunction with a conventional hydraulic jack and for removing a transfer case from an automobile transmission. The device comprises a base mountable to the hydraulic jack and a cradle plate pivotally connected to the base for movement about a horizontal axis of rotation. To remove the crank case from the transmission, the base is mounted over the extensible portion of the jack and the same is raised until the cradle plate engages the crank case and is securely mounted thereto. Subsequently, the plate is pivoted downwardly to tilt the crank out of the way of obstructing parts of the automobile, and then the crank is transported on the jack to a work area for repair.

In addition, U.S. Pat. No. 4,188,010, to Hanscom, issued Oct. 3, 1978, discloses a lifting device comprising, in relevant part, a castered base, an upright support mounted to one side of the base and a boom adapted to pivotally attach to upper or lower portions of the upright support for vertical movement with respect thereto. A hydraulic cylinder is used for actuating pivotal movement of the boom. When the boom is mounted to the top portion of the upright support, the boom functions as a hoist and for this purpose is provided with a hook, chain or cable for lifting. When the boom is mounted to the bottom portion of the upright support, the boom functions as a jacking device for removing and installing automobile transmissions and the like and for this purpose is provided with a cradle tiltably mounted at the rear end of the boom. The cradle can be adjusted to fit various types of transmissions, gear boxes or the like and can be raised or lowered while maintaining a predetermined level relative to the horizontal.

Further, U.S. Pat. No. 2,643,779, to Hamlin, issued Jan. 15, 1949, discloses a jack for handling transmissions and the like during installation and removal of the same and comprising a castered base, a frame at one end of the base, and an arm pivotally secured to the frame. A pneumatic cylinder is secured to and between the frame and the arm and actuates vertical movement of the arm. A cradle is pivotally mounted to the free end of the arm for rotation in the plane of movement of the arm. The transmission is adapted to mount to the cradle. In this manner, the cradle is rotatably adjustable independent of the arm.

Although the devices disclosed above overcome any of the disadvantages associated with conventional jacks, they are not without their own drawbacks. Many of these devices include a boom pivotally mounted to a base and a support pivotally mounted to the free end of the boom to permit the support to maintain a horizontal condition when the boom is moved between upper and lower positions. The support, however, is only rotatable through a horizontal axis of rotation. In addition, although in some instances the support may be adjusted to mount more than one type of automotive part, as disclosed above by Hanscom, in the majority of cases, only one support is provided. Thus, the support is, by its very nature, limited to the types of parts which it can mount and the secureness of the mounting.

Therefore, it has been found desirable to provide a lifting device for automotive parts and including a vertically adjustable boom adapted to adjustably mount a variety of automotive part attachments for movement through horizontal, vertical and diagonal axes of rotation. In addition, it has been found desirable to adapt the supports to mount, for secure custom-fit attachment, a variety of automotive parts. In this manner, a device provides for universal adjustment in a variety of directions in three-dimensional space and attains universal application to large numbers, sizes and shapes of automotive parts in need of replacement or repair.

SUMMARY OF THE INVENTION

In accordance with the invention, a device facilitates removal and installation of vehicle parts and comprises a base, a boom having front and rear portions and pivotally mounted at the front portion to the base for movement between upper and lower positions, a jack means mounted on the base and for effecting pivotal movement of the boom and a mounting means on the rear portion of the boom and adapted to interchangeably and rotatably mount any one of a plurality of attachment means adapted to support a vehicle part. The mounting means comprises a socket formed in the rear end of the boom. The attachment means includes a peg adapted to be rotatably received within the socket to mount the attachment means to the boom.

In one embodiment of the invention, the attachment means comprises a lower bracket to which said peg is secured, an upper bracket having a securing means for securing a vehicle part to the attachment means, the upper bracket being pivotally mounted to the lower bracket for movement between top and bottom positions and normally drawn to the bottom position by the weight of the upper bracket and the securing means, and an adjustment means for effecting pivotal movement of the upper bracket relative to the lower bracket. The adjustment means comprises a bore extending through the upper bracket and a threaded bolt threadably received in the bore, matingly engaging the lower bracket and responsive to applied rotational forces to transmit the forces on the upper and lower brackets and along a longitudinal axis of the bolt to pivot the upper bracket between the top and bottom positions. The securing means comprises a wheel means rotatably mounted to the upper bracket and comprising a number of wheel apertures adapted to be aligned with apertures of a vehicle part, and a plurality of mounting bolts adapted to extend through the aligned wheel and vehicle part apertures to mount the vehicle part to the attachment means. The securing means can also include a plurality of spacer tubes adapted to be aligned with the aligned wheel and vehicle part apertures and positioned between the aligned wheel and vehicle part apertures. The mounting bolts are also adapted to extend through the aligned wheel and vehicle part apertures and tubes to mount a vehicle part to the wheel means in spaced relationship thereto.

In another embodiment of the invention, the securing means comprises the wheel means rotatably mounted to the upper bracket and a plurality of bar means rotatably mounted to the wheel means and comprising a number of bar apertures adapted to be aligned with apertures of a vehicle part. The mounting bolts are adapted to extend through the aligned bar and vehicle part apertures to mount a vehicle part to the attachment means. It is contemplated that the bar apertures can extend along longitudinal axes of the bars. It is also contemplated that the securing means further comprises the spacer tubes adapted to be aligned with the aligned bar and vehicle part apertures and be positioned between the aligned bar and vehicle part apertures, wherein the mounting bolts are also adapted to extend through the aligned bar and vehicle part apertures and tubes to mount the vehicle part to the bars in spaced relationship thereto.

In a further embodiment of the invention, the securing means comprises a rod rotatably mounted to the upper bracket and having an outer surface with a plurality of external splines formed thereon and adapted to engage internal splines formed within a socket of a vehicle part to mount the vehicle part to the attachment means.

In still another embodiment of the invention, the socket through the boom extends substantially vertically therethrough and the attachment means is adapted to be received in the socket for rotational movement on a substantially vertical axis of rotation. In this embodiment, the attachment means includes an extension means rigidly secured to or formed integral with and positioned at an angle with respect to the peg and for extending the rotational radius of the attachment means when the peg means is rotated with respect to the rear portion of the boom, and a support plate means rotatably connected to the extension means and adapted to support a vehicle part.

In a further embodiment of the invention, the device includes a receiver means pivotally mounted on the rear portion of the boom for movement in substantially the same plane of movement of the boom and a leveling means for maintaining the receiver means in a substantially horizontal condition as the boom pivots between the upper and lower positions. In this embodiment, the mounting means is on the receiver means and is adapted to interchangeably and rotatably mount any one of a plurality of attachment means for supporting a vehicle part. In addition, in this latter embodiment, the mounting means comprises a substantially vertical socket formed in the receiver. In addition, attachment means is adapted to be rotatably received within the socket to mount the attachment means to the receiver means.

BRIEF DESCRIPTION OF THE DRAWINGS

The invention will now be described with reference to the drawings in which.

DESCRIPTION OF THE PREFERRED EMBODIMENTS

Figure 1:
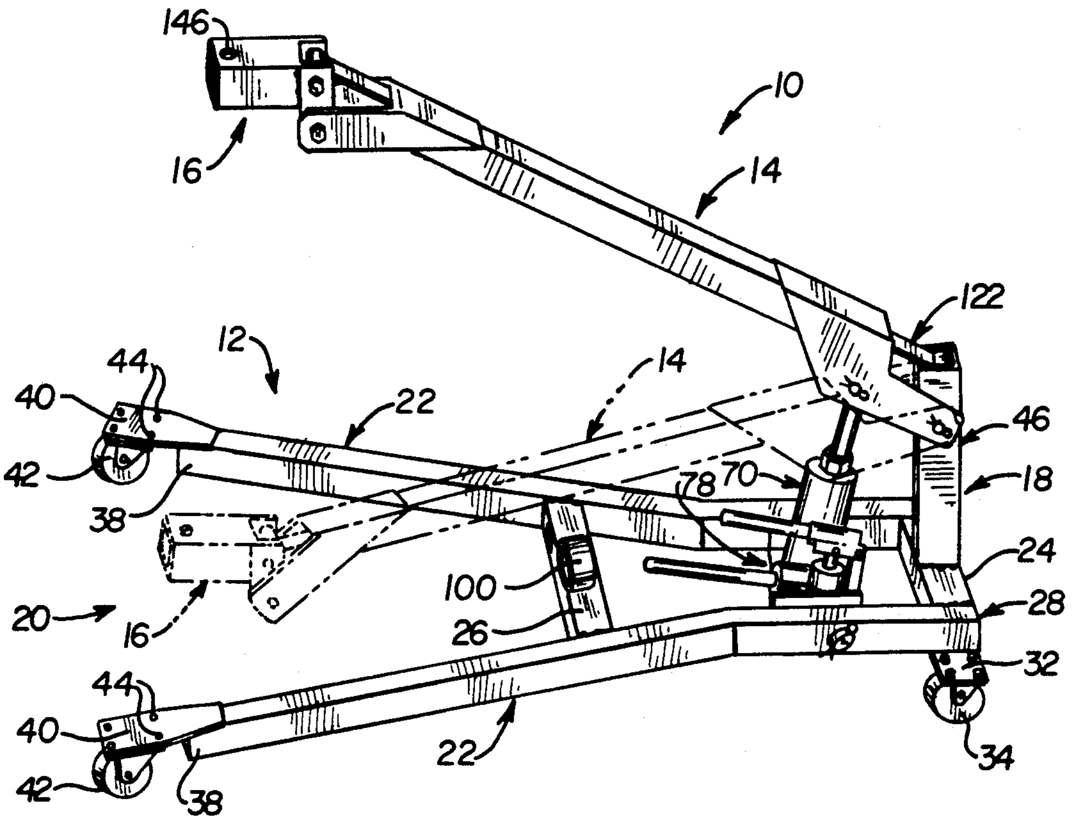
FIG. 1 is a side perspective view of a lifting device of the invention and illustrating a boom thereof in a lower position in phantom lines and in an upper position in solid lines.

Referring now to the drawings in detail, and in particular to FIG. 1, a lifting device, generally indicated by reference numeral 10, comprises a floor-engaging base 12, an articulating boom 14 pivotally mounted to the base, an articulating receiver 16 movably mounted to the arm and a variety of attachments, as hereinafter referenced and described in detail, interchangeably and adjustably mounted, in a universal fashion, to the articulating receiver and adapted to mount a variety of automotive parts.

For convenience in understanding the following description, the device 10 will be referred to as having a front end 18 and a rear end 20. The base 12 is substantially formed by a pair of longitudinal frame members 22 and a pair of transverse frame members 24, 26 rigidly secured to and between the longitudinal frame members substantially at the front end 18 of the device 10. The transverse frame member 24 is secured to and between the longitudinal frame members 22 substantially adjacent front axial ends 28 thereof. The longitudinal frame members 22 are substantially parallel at the front end 18 of the device 10, but are bent at 30 outwardly so as to gradually diverge toward the rear end 20 of the device. This diverging feature of the longitudinal frame members 22 provides the device 10 with a broad base of support for the relatively heavy automotive parts mounted to the boom 14 substantially over the rear end 20 of the device. The transverse frame member 26 is mounted to and between the longitudinal frame members 22 just rearwardly of the bends 30 of the same. In this manner, the transverse frame member 26 rigidifies the longitudinal frame members 22 along transverse axes thereof adjacent the bends 30.

The base 12 is mobile and to this end further comprises a pair of ears 32 rigidly secured to and positioned substantially adjacent the front axial ends 28 of the longitudinal frame members 22 and opposite the transverse frame member 24. Floor-engaging front swivel caster assemblies 34 are securely mounted, as by front bolts 36, to the ears 32. In addition, secured adjacent to and extending rearwardly of rear axial ends 38 of the longitudinal frame members 22 are caster mounting plates 40 to which rear swivel caster assemblies 42 are securely mounted by rear bolts 44. By positioning the ears 32 outwardly of the longitudinal frame members 22, the front portion of the device is wheelable from a much broader base of support than if the caster assemblies 34 were mounted directly to the longitudinal frame members. Similarly, positioning of the mounting plates 40 rearwardly of the longitudinal frame members 22 provides the device with a broad base of support.

Preferably, the longitudinal and transverse frame members 22, 24, 26 are constructed of hollow steel tubes, square, in cross section. In addition, the frame members are preferably rigidly secured together by welding It is contemplated, however, that the longitudinal and transverse frame members can be mounted together by any suitable mechanical means, such as by a nut and bolt connection. Similarly, the ears 32 and the mounting plates 44 are preferably welded to the longitudinal frame members 22.

Figure 2:
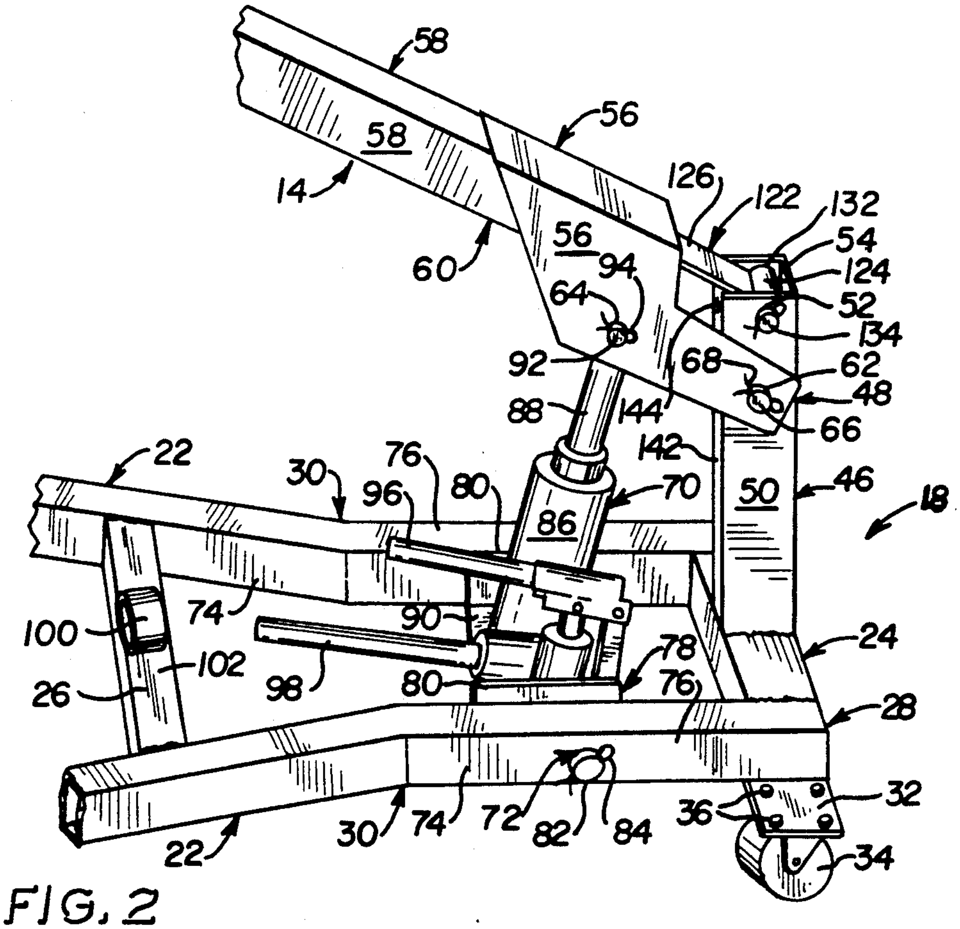
FIG. 2 is an enlarged side perspective view of a front end of the device shown in FIG. 1 and illustrating a pivotal connection between the boom and a mast of the device.

As stated above, the boom 14 is pivotally connected to the base 12, and to this end, the device 10 further comprises, as illustrated in FIGS. 1 and 2, a mast 46 rigidly secured to and positioned centrally on the transverse frame member 24. Like the longitudinal and transverse frame members 22, 24, 26, the boom 14 and the mast 46 are preferably made of tubular, square, in cross section, members. The mast 46 includes a pair of aligned lower holes 48 extending through opposing side walls 50 of the mast and a pair of aligned upper holes 52 extending through the side walls 50 and positioned above lower holes 48 and adjacent upper end 54 of the mast.

The boom 14 comprises a pair of front plates 56 rigidly secured to, as by welding, opposing side walls 58 of the boom, on front portion 60 thereof, and extending forwardly of and-substantially coextensive and parallel with, but lower than, the longitudinal axis of the boom. The front plates 56 include a pair of aligned front holes 62 and a pair of aligned rear holes 64 extending therethrough. The front plates 56 are positioned adjacent and outwardly of the side walls 50 of the mast 46 such that the lower holes 48 thereof are aligned with the front holes 62. A first pin 66 extends through the aligned pairs of lower and front holes 48, 62 to mount the boom 14 to the mast 46. In this manner, the boom 14 is adapted for pivotal movement between an upper position, as illustrated in FIG. 1 in solid lines, and a lower position, as illustrated in the same Figure in phantom lines. The first pin 66 is prevented from disengagement from the holes 48, 62 by first cotter pins 68 extending through holes (not shown) in ends of the first pin.

The front plates 56 of the boom 14 extend forwardly and below the longitudinal axis of the boom 14 so as to, in part, to avoid interference of the front portion 60 of the boom with the upper end 54 of the mast 46 as the boom pivots between the upper and lower positions so as to permit free pivotal movement of the boom relative to the mast. The front plates 56 also function to add stability to the boom 14 so as to prevent the same from lateral wobble as the boom pivots between the upper and lower positions.

To facilitate pivotal movement of the boom 14, the device 10 further comprises a manually operated pneumatic jack 70 operably connected to and between the base 12 and the boom 14. Specifically, as shown in FIG. 2, each longitudinal frame member 22 includes a pair of corresponding aligned openings 72 extending through opposing sides 74 of parallel sections 76 of the longitudinal frame members at the front end 18 of the device 10. A substantially U-shaped cradle 78 has a pair of aligned openings (not shown) extending through legs 80 of the U-shape, with each opening (not shown) aligned with a respective aligned pair of openings 72 in a corresponding longitudinal frame member 22. The cradle 78 is pivotally mounted to and between the longitudinal frame members 22 by a pair of second pins 82 extending through the sets of aligned openings in the longitudinal frame members 22 and the legs 80. A pair of second cotter pins 84 extend through openings (not shown) in ends of each second pin to prevent disengagement of the second pin from its mounting to the longitudinal frame member 22 and the cradle 78.

The jack 70 is of the conventional manually operated type and comprises a lower cylinder 86 and an upper piston rod 88 extensibly mounted to and within the cylinder. The cylinder 86 is securely connected, as by a nut and bolt connection, to bite portion 90 of the U-shaped cradle 78. In this manner, the jack 70 is pivotally connected to the base 12. The piston rod 88 has secured on a top axial end (not shown) thereof a cap (not shown) and a horizontal tube (not shown) rigidly secured to the cap and positioned transversely of the device 10. Ends (not-shown) of the tube (not shown) are aligned with and positioned between the aligned rear holes 64 of the front plates 56. A third pin 92 extends through the tube (not shown) and the aligned rear holes 64 to pivotally mount the jack 70 to the boom 14. A pair of third cotter pins 94 extend through openings (not shown) in ends of the third pin 92 to prevent disengagement of the same from the front plates 56. In this manner, the jack 70 is pivotally connected to and between the boom 14 and the base 12 so as to enable the jack to freely rotate on its pivotal connections as the boom is moved between the upper and lower positions. The jack 70 further includes an actuating handle 96 for extending the piston rod 88 with respect to the cylinder 86, and a valve handle 98 connected to the jack valve (not shown) for releasing the piston rod from its extended position.

Preferably, a two-ton jack is employed in connection with the invention. Because of the relatively close proximity of the jack 70 to the pivotal connection between the boom 14 and the mast 46, the jack 70 is at a significant disadvantage and is therefore only able to lift approximately 600 pounds on the boom during operation of the device 10. However, this is thought to be adequate for the lifting of most vehicle parts. Such jack is commercially available from Heins-Warner Company of Waukesha, Wis.

It should be noted that due to the relatively heavy vehicle parts that may be carried by the boom 14, actuation of the valve handle 98 when the boom is in the upper position may cause sudden contraction of the piston rod 88 relative to the cylinder 86. Such rapid contraction may result in an abrupt and forceful engagement of the piston (not shown) with the cylinder 86, possibly damaging the jack. To prevent such damage, a protective loop 100 is mounted to upper central surface 102 of the transverse frame member 26 as by welding. As the boom pivots to the lower position, the same engages the loop 100 to prevent any further contraction of the piston rod 88 and thus abrupt engagement of the piston (not shown) with the cylinder 86.

To mount vehicle parts onto the boom 14, the device 10 is provided with the receiver 16 pivotally mounted on rear portion 104 of the boom 14. The receiver 16 is L-shaped and formed of a vertical leg 106 and a horizontal leg 108, with the legs made of substantially the same tubular square, in cross section, members as the longitudinal and transverse frame members 22, 24, 26, the boom 14 and the mast 46. The horizontal leg 108 provides a mounting means for the numerous automotive part attachments as described hereinafter in detail.

Figure 3:
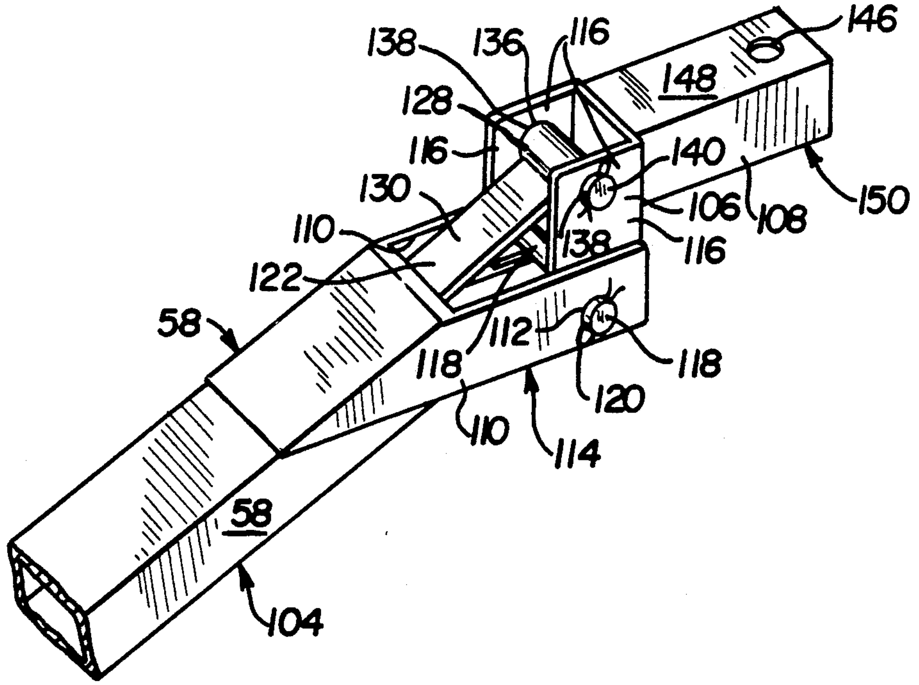
FIG. 3 is an enlarged perspective view of a rear portion of the boom and illustrating a pivotal connection between the boom and a receiver of the device.

A pivotal connection between the receiver 16 and the boom 14 is necessary to permit the horizontal leg 108 of the receiver to maintain a level, substantially horizontal condition as the boom 14 moves between the upper and lower positions so as to maintain a level condition of the vehicle parts mounted to the receiver. To this end, as illustrated in FIG. 3, a pair of rear plates 110 are rigidly secured to, as by welding, the opposing side walls 58 of the boom 14 and extend rearwardly of and are angled downwardly with respect to the rear portion 104 thereof. The rear plates 110 include a pair of aligned bores 112 extending therethrough. The vertical leg 106 of the receiver 16 includes a pair of lower bores 114 extending through opposing sides 116 and aligned with the bores 112 of the rear plates 110. A fourth pin 118 extends through the aligned bores 112, 116 to pivotally mount the receiver 16 to the rear plates 110. A pair of fourth cotter pins 120 extend through holes (not shown) in ends of the fourth pins to prevent disengagement of the same from the aligned bores 112, 116.

To guide the receiver 16 through pivotal movement and maintain the horizontal leg 108 of the same level as the boom pivots between the upper and lower positions, the device 10 is provided with a tie-rod 122 telescopically engaging the tubular boom 14 and pivotally mounted to and between the mast 46 and the receiver 16. As shown in FIGS. 2 and 3, the tie-rod 112 includes a front bearing 124 on a forward end 126 of the tie-rod and a rear bearing 128 on a rearward end 130 of the tie-rod. The front bearing 124 includes a horizontal front bore 132 aligned with the upper holes 52 of the mast 46, and a fifth pin 134 extends through the aligned front bore and upper holes to pivotally mount the tie-rod to the mast. The rear bearing 128 includes a horizontal rear bore 136 aligned with a pair of upper bores 138 extending through the opposing sides 116 of the vertical leg 106 of the receiver 16, and a sixth pin 140 extends through the aligned rear bore 136 and upper bores 138 to pivotally mount the tie-rod to the receiver. In this manner, as the boom 14 moves between the upper and lower positions, the receiver pivots on the fourth pin 118, and the horizontal leg of the receiver is maintained in a horizontal condition.

To permit free pivotal movement of the tie-rod 122 with respect to the receiver 16, the vertical leg 106 thereof is provided without top and rear walls. In addition, the position of the rear plates 110 at an angle with respect to the boom 14 permits free movement of the tie-rod 122 with respect to the rear portion 104 of the boom. The tie-rod 122 also pivots about fifth pin 134 without interference with the mast 46 due to the same being open on the upper end 54 thereof and rear wall 142 of the mast having notched out portion 144 on the upper end of the mast. The front portion 60 of the boom 14 is permitted to freely pivot about its pivotal connection due to the forward positioning of the front plates 56 with respect to the boom.

As stated above, the receiver 16 is adapted to adjustably mount a variety of vehicle part attachments, as hereinafter described in detail, and to this end, the horizontal leg 108 of the receiver is provided with a pair of aligned holes 146 extending through opposing upper and lower walls 148, 150 of the horizontal leg and forming a socket therethrough. The socket forms a means for mounting the vehicle part attachments to the boom 14. Each of the vehicle part attachments includes an attachment peg, referenced and described below, adapted to slidably and rotatably engage the aligned holes 146 to mount the attachment to the receiver 16 for adjustable movement about a vertical axis of rotation. Each attachment can further comprise a stop plate, referenced and described below, on the pin means and adapted to engage the upper wall 150 of the horizontal leg 108 of the receiver, when the attachment is mounted to the receiver, to provide a secure mounting of the attachment to the receiver and to assist in relative free rotation of the attachment with respect to the receiver. In this manner, the attachments are not only adjustably mounted to the boom through a horizontal axis of rotation, but they are also mounted to the receiver through a vertical axis of rotation. In addition, as will be described below, the attachments are further adjustable with respect to tilt and other angular adjustment.

Figure 4:
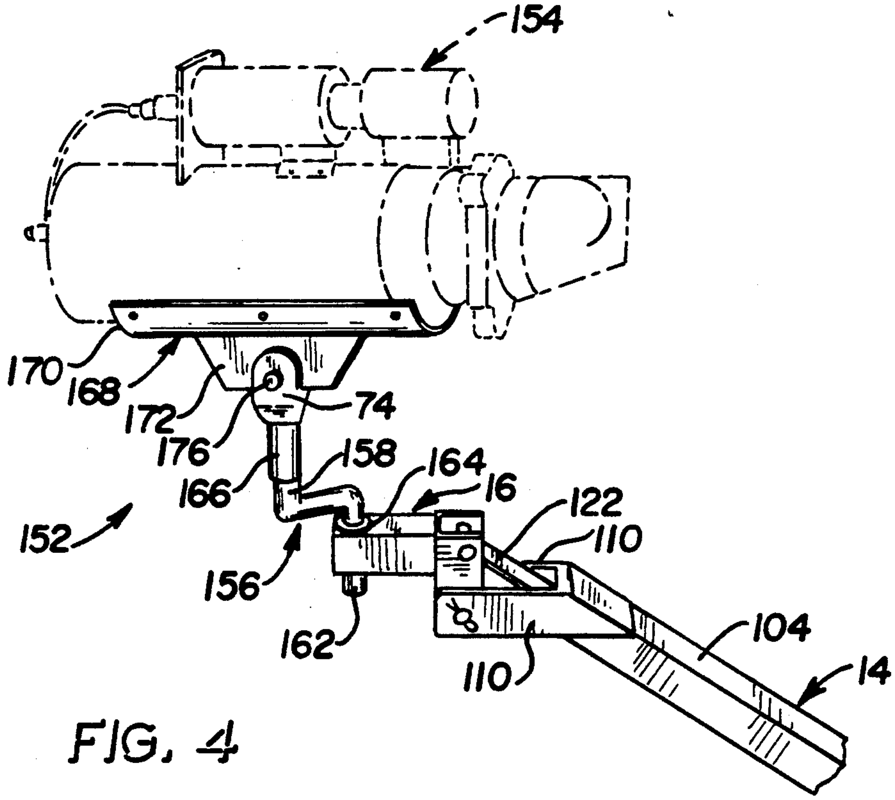
FIG. 4 is a side perspective view of the boom and the receiver shown in FIG. 3 and illustrating a pivotal connection between the receiver and a starter attachment of the device.

As examples, three vehicle part attachments are disclosed herein. It is contemplated, however, that the device 10 can incorporate a number of attachments specific for particular vehicle parts to be removed or installed. As illustrated in FIG. 4, a cradle attachment 152 for supporting a starter 154, illustrated in dotted lines, is adjustably mounted to the receiver 16 by a first adjustment peg 156 slidably and rotatably engaging the aligned holes 146. The first adjustment peg 156 is bent so as to form upper and lower vertical section 158, 160 and a horizontal section 162 intermediate the same. A stop plate 164 is rigidly mounted to the lower vertical section 160 to support the first attachment peg, and thus the cradle attachment 152, to the receiver 16. The horizontal section 162 of the first attachment peg 156 permits rotational adjustment of the cradle attachment through horizontal planes. Thus, the horizontal section 162 functions to extend the rotational radius of the cradle attachment 152 when the peg 156 is rotated with respect to the rear portion of the boom 14. An upper forked collar 166 slidably and securely engages the upper vertical section 158 and rotatably mounts a cradle plate 168. The cradle plate comprises a semicircular plate 170 and a vertically positioned mounting plate 172 rotatably mounted to and between forks 174 of the collar 166 by horizontal bolt 176. The pivotal connection provided by the horizontal bolt 176 permits vertical tilt adjustment of the cradle plate 168. Ordinarily, the cradle plate 168 is adjustably positioned about its pivotal connection on horizontal bolt 178 prior to placing the starter 154 on the cradle. In contrast, pivotal adjustment of the cradle attachment 152 on first attachment peg 156 can occur anytime during removal and installation of the starter and pivotal movement of the boom 14. Further, rotational adjustment of the receiver 16 with respect to the boom 14 necessarily takes place when the same moves between the upper and lower positions. Although the cradle plate 168 illustrated in FIG. 4 is particularly adapted to support the starter 154, other automotive parts, such as stearing boxes, air tanks and the like (not shown) can be removed and installed utilizing the cradle attachment 152.

Figure 5:
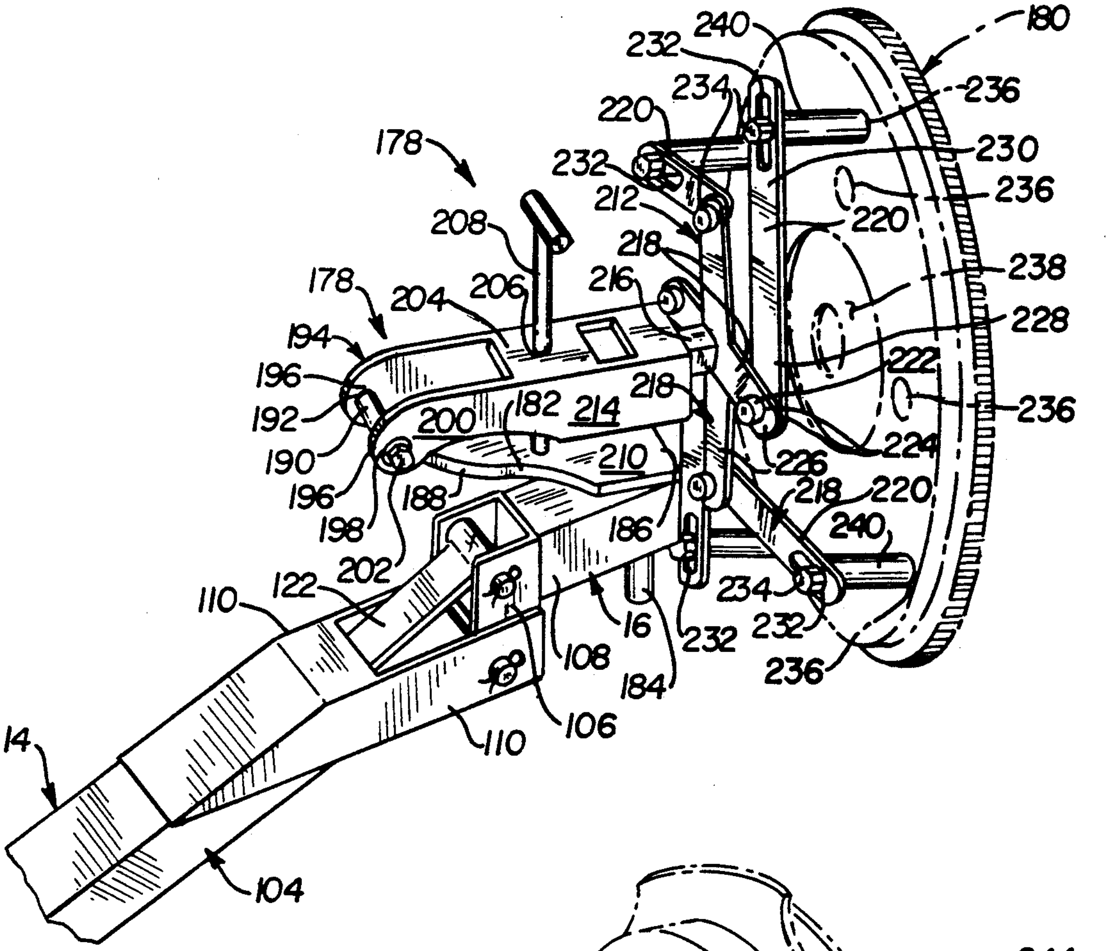
FIG. 5 is a perspective view of the boom and the receiver shown in FIG. 3 and illustrating a pivotal connection between the receiver and a fly wheel attachment of the device.

Referring to FIG. 5, there is shown a flywheel attachment 178 adjustably mounted to the receiver 16 and mounting a flywheel 180 illustrated in dotted lines. Specifically, the attachment 178 includes a lower bracket 182 removably mounted the receiver 16 by a second attachment peg 184 rigidly secured to and depending downwardly from front 186 of the lower bracket 182 and slidably engaging the aligned holes 146 of the horizontal leg 108 of the receiver. Back 188 of the lower bracket 182 includes a bearing 190 having a bore 192 extending therethrough. An upper bracket 194 comprises a pair of side plates 196 having a pair of aligned orifices 198 extending through back sides 200 of the side plates. A bracket bolt 202 extends through the aligned bore and orifices 992, 198 to tiltably mount the upper bracket 194 to the lower bracket 182. A horizontal top plate 204 has a threaded bore 206 extending therethrough and is mounted to and between the side plates 196. A threaded T-bolt 208 engages the bore 206 and securely and matingly engages, at all times, due to the weight of the attachment 178 and flywheel 180 mounted thereto, top surface 210 of the lower bracket 182. In this manner, threading of the T-bolt 208 to a greater or lesser extent in bore 206 tilts the upper bracket 194 up and down with respect to the lower bracket 182. Thus, the top plate 204, with its threaded bore 206, and the T-bolt 208 function as a means for adjusting the tilt of the upper bracket 194 relative to the lower bracket 182.

The flywheel attachment 178 further comprises a wheel 212 rotatably mounted to front side 214 of the upper bracket 194 at 216. The wheel 212 is freely rotatable with respect to the upper bracket 194 and includes a plurality of equidistantly spaced arms 218. An equal number of elongated mounting bars 220 are pivotally mounted to the arms 218 by first mounting bolts 222 extending through aligned slots 224 in outer ends 226 and inner parts 228 of the arms and bars, respectively. Outer parts 230 of the mounting bars 220 have extending therethrough elongated slots 232. The flywheel 180 is securely mounted to the attachment 178 by second mounting bolts 234 extending through the elongated slots 232 and flywheel bores 236 aligned with the elongated slots. When the flywheel 180 is mounted to a crankcase (not shown) of the vehicle (not shown), the flywheel bores 236 provide a means through which bolts (not shown) securely mount the flywheel to the crankcase.

In operation of the device, for example, to remove the flywheel 180 from the crankcase (not shown), the attachment 178 is first rotatably mounted to the receiver in the manner stated above. The boom 14 is then raised or lowered, through actuation of handles 96, 98, so as to position the attachment 178, and specifically the wheel 212 and the mounting bars 220, adjacent the flywheel 180. The T-bolt 208 is then turned in an appropriate direction to adjust the attitude of the upper bracket 194, and thus the wheel 212 and the mounting bars 220, to more closely align with the flywheel 180 mounted to the crankcase (not shown). The wheel 212 and the mounting bars 220 are then rotated to align the elongated slots 232 of the bars with an equal number of flywheel bores 236 which are not presently being used for mounting the flywheel to the crankcase. The second mounting bolts 234 are then set through the aligned elongated slots 232 and the flywheel bores 236 to mount the flywheel 180 to the attachment 178. Once so mounted, the flywheel 180 can be removed from the crankcase by removing bolts (not shown) extending through other flywheel bores 236. The flywheel 180 can then be wheeled away on the device 10 to a work or other area for disposal or repair. Installation of a new or repaired flywheel is performed by substantially following the foregoing steps but in the reverse order.

The pivotal mounting of the wheel 212 and the mounting bars 220 to the upper bracket 194 and the wheel arms 218, respectively, and the employment of elongated slots through which second mounting bolts 234 extend permit adjustment of the attachment 178 so as to mount flywheels of a variety of size and shape and having flywheel bores set in various configurations.

Due to the flat, disc-like shape of many flywheels, for example, the flywheel 180 illustrated in FIG. 5, a means to mount the flywheel to the mounting bars 220, in spaced relationship thereto, is required in order to permit access to a space 238 adjacent the flywheel to perform operations necessary to the installation and removal of the flywheel with respect to the crankcase (not shown). Such space is necessary to, for example, remove or install second mounting bolts 234 through the aligned slots and bores 232, 236 as described above. To this end, as illustrated in FIG. 5, a plurality of spacer tubes 240 are mounted to and between the flywheel 180 and the mounting bars 220 and the second mounting bolts 234 extend through the tubes to mount the flywheel to the attachment 178. In this manner, the tubes 240 function to mount the flywheel 180 to the attachment 178 in spaced relationship thereto. The spacer tubes 240 are not required when mounting flywheels of concave shape because such shape provides sufficient space between the flywheel and the attachment 178 to perform the above-stated installation and removal operations.

Although the flywheel attachment 178 is particularly adapted for mounting flywheels 180, the attachment can also be employed for installation or removal of flywheel housings (not shown) and bell housings (not shown). These automotive parts can be mounted to the attachment 178 in the same manner as that described above with respect to flywheel 180 by second mounting bolts 234 extending through the elongated slots 232 and aligned bores (not shown) within the flywheel and bell housings (not shown).

Figure 6:
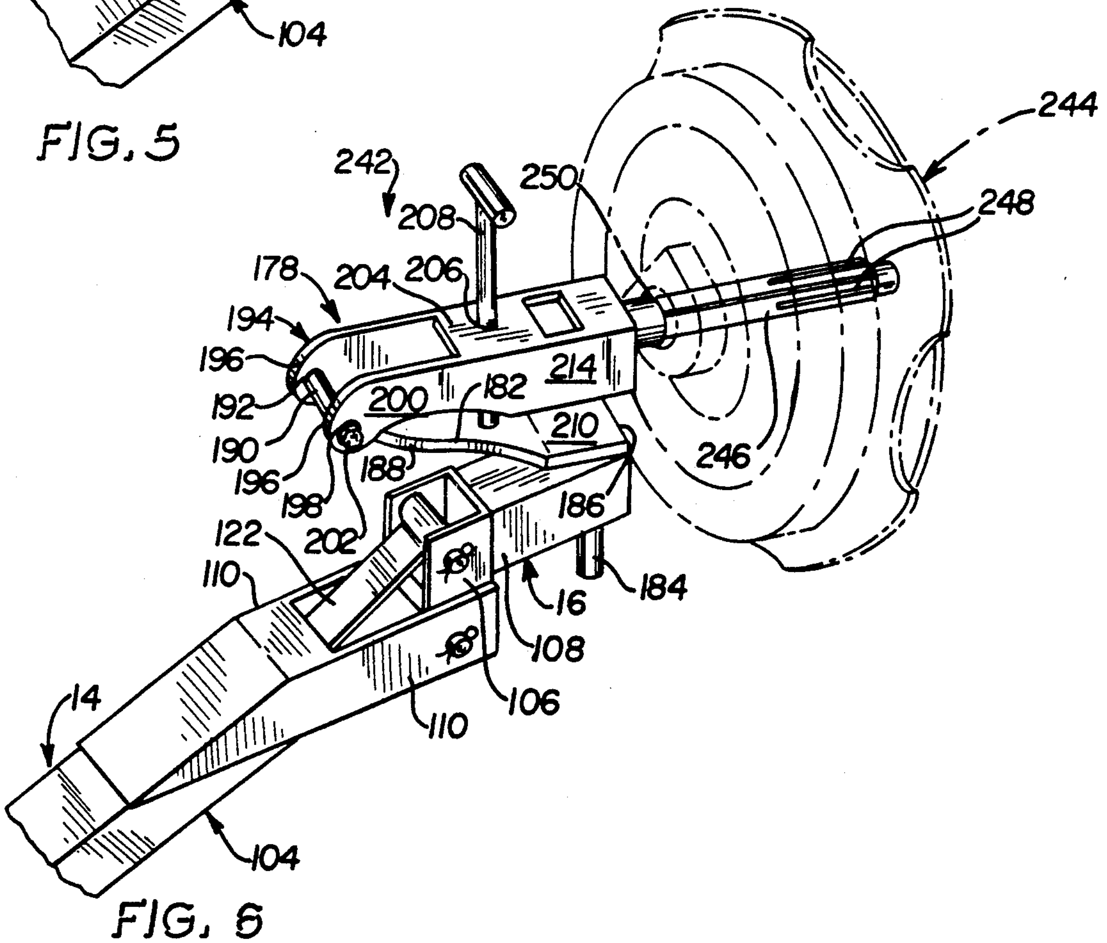
FIG. 6 is a perspective view of the boom and the receiver shown in FIG. 3 and illustrating a pivotal connection between the receiver and a clutch attachment of the device.

In FIG. 6 there is shown a clutch attachment 242 adjustably mounted to the receiver 16. A clutch 244 mounted to the attachment 242 is illustrated in dotted lines. The attachment 242 is identical to the fly wheel attachment 178, except that the clutch attachment 242 includes an elongated mounting rod 246 rotatably mounted on the front side 214 of the upper bracket 194 instead of the wheel 212 and the mounting bars 220. The clutch attachment 242 illustrated in FIG. 6 therefore comprises substantially the same component parts as the fly wheel attachment shown in FIG. 5. Accordingly, FIG. 6 is provided with substantially the same reference numerals as those shown in FIG. 5.

The elongated mounting rod 246 is substantially circular, in cross-section, and has extending along substantially longitudinal axes of the rod a series of external splines 248. The mounting rod 246 is substantially identical to a splined rod (not shown) of a transmission (not shown). When the clutch 244 is mounted to the transmission, the internal splines of the clutch 244 mate with the external splines (not shown) of the splined transmission rod (not shown). Thus, the mounting rod 246 is adapted to mount to the clutch 244 in the same manner in which the clutch mounts to the transmission (not shown).

In operation of the device 10 to, for example, remove the clutch 244 from a fly wheel of a vehicle (not shown), the transmission (not shown) is first removed from engagement with the clutch by removing the splined rod (not shown) of the transmission from mating engagement with the internal splines (not shown) of the clutch. Subsequently, the attachment 242 is rotatably mounted to the receiver in the same manner as the fly wheel attachment 178 is rotatably mounted to the receiver as shown in FIG. 5. The boom 14 is then raised or lowered, through actuation of the jack handles 96, 98, so as to position the clutch attachment 246, and specifically the mounting rod 246, adjacent the clutch 244. The T-bolt 208 is then turned in an appropriate direction to adjust the attitude of the bracket 194 to more closely align the mounting rod 246 with the clutch 244. The rod 246 is then rotated with respect to the receiver 16 so as to align the external splines 248 of the rod with internal splines (not shown) within a bore 250 of the clutch 244. The mounting rod 246 is then set in engagement with the clutch 244 such that the external splines of the former mate with the internal splines of the latter. Once so mounted, the clutch can be detached from the flywheel and subsequently wheeled on the device to a work or other area for disposal or repair. Installation of a new or repaired clutch is performed by substantially following the foregoing steps but in the reverse order.

While the invention has been described in connection with a preferred embodiment, it will be understood that I do not intend to limit the invention to that embodiment. To the contrary, I intend to cover all alternatives, modifications and equivalents as may be included within the spirit and-scope of the invention as defined by the appended claims.

The embodiments of the invention in which an exclusive property or privilege is claimed are defined as follows:

1. A device for facilitating removal and installation of vehicle parts and comprising a base, a boom having front and rear portions and mounted at said front portion on said base for pivotal movement about a horizontal axis of rotation, jack means mounted on said base for effecting pivotal movement of said boom, mounting means on said rear portion of said boom for mounting attachment means for movement about a vertical axis of rotation, said attachment mean being adapted to support a vehicle part and comprising a lower bracket mounted on said boom by said mounting means, an upper bracket and securing means mounted thereon for connecting a vehicle part to said attachment means, said upper bracket being on said lower bracket for vertical movement about a horizontal axis of rotation between top and bottom positions and normally drawn toward said bottom position by the weight of said upper bracket and said securing means, said attachment means further comprising adjustment means for effecting vertical movement of said upper bracket relative to said lower bracket between said top and bottom positions, said securing means comprising wheel means rotatably mounted on said upper bracket about a horizontal axis and having a number of wheel apertures adapted to be aligned with apertures of a vehicle part, said securing means further comprising a plurality of mounting bolts adapted to extend through said aligned wheel and vehicle part apertures to mount a vehicle to said attachment means, whereby said wheel apertures are adapted to be set in alignment with apertures of a vehicle part to permit mounting of a vehicle part to said attachment means upon selected rotational adjustment of one or more of said boom, said lower bracket, said upper bracket and said wheel means.

2. A device according to claim 1, wherein said securing means further comprises a plurality of bars and a plurality of bar mounting bolts, each of said bars comprising a pair of first and second bar apertures, said wheel apertures also being adapted to be aligned with said first bar apertures alternatively with said vehicle part apertures, said second bar apertures being adapted to be aligned with said vehicle part apertures, said mounting bolts also being adapted to extend through said aligned wheel and first bar apertures alternatively with said aligned wheel and vehicle part apertures to mount said bars to said wheel means, said bar mounting bolts being adapted to extend through said aligned second bar and vehicle part apertures to mount a vehicle part to said attachment means.

3. A device according to claim 1, wherein said mounting means comprises a socket formed in said rear end of said boom; and said attachment means comprises a peg adapted to be rotatably received within said socket to mount said attachment means to said boom.

4. A device according to claim 1, wherein said adjustment means comprises a bore extending through said upper bracket and a threaded bolt threadably received in said bore, matingly engaging said lower bracket and responsive to applied rotational forces to transmit said forces on said upper and lower brackets and along a longitudinal axis of said bolt to pivot said upper bracket between said top and bottom positions.

5. A device according to claim 1, wherein said securing means further comprises a plurality of spacer tubes adapted to be aligned with said aligned wheel and vehicle part apertures and positioned between said aligned wheel and vehicle part apertures; and said mounting bolts are adapted to extend through said aligned wheel and vehicle part apertures and tubes to mount a vehicle part to said wheel means in spaced relationship thereto.

6. A device according to claim 2, wherein said second bar apertures are elongated and extend along longitudinal axes of said bar means.

7. A device according to claim 6, wherein said securing means further comprises a plurality of spacer tubes adapted to be aligned with said aligned second bar and vehicle part apertures and be positioned between said aligned second bar and vehicle part apertures; and said bar mounting bolts are adapted to extend through said aligned second bar and vehicle part apertures and tubes to mount a vehicle part to said bar means in spaced relationship thereto.

* * * * *